US012788024B2

(12) United States Patent
Wang

(10) Patent No.: US 12,788,024 B2
(45) Date of Patent: Nov. 10, 2026

(54) OIL ENCAPSULATED IN NATURAL PLANT-BASED MATERIAL

(71) Applicant: MARA Renewables Corporation, Dartmouth (CA)

(72) Inventor: Huiqin Wang, Dartmouth (CA)

(73) Assignee: MARA RENEWABLES CORPORATION, Dartmouth (CA)

( * ) Notice: Subject to any disclaimer, the term of this patent is extended or adjusted under 35 U.S.C. 154(b) by 520 days.

(21) Appl. No.: 18/333,153

(22) Filed: Jun. 12, 2023

(65) Prior Publication Data

US 2023/0397628 A1 Dec. 14, 2023

Related U.S. Application Data

(60) Provisional application No. 63/352,190, filed on Jun. 14, 2022.

(51) Int. Cl.

*A23D 7/005* (2006.01)
*A23L 29/10* (2016.01)
*A23L 33/12* (2016.01)

(52) U.S. Cl.

CPC .............. *A23D 7/005* (2013.01); *A23L 29/10* (2016.08); *A23L 33/12* (2016.08)

(58) Field of Classification Search

CPC ......... A23D 7/005; A23D 9/007; A23L 29/10; A23L 33/12; A23L 33/115; A23L 33/15; A23L 27/72; A23K 20/158; A23P 10/30

See application file for complete search history.

(56) References Cited

U.S. PATENT DOCUMENTS

| | | | |
|---|---|---|---|
| 5,013,536 | A | 5/1991 | Vaughan et al. |
| 5,340,594 | A | 8/1994 | Barclay |
| 5,340,742 | A | 8/1994 | Barclay |
| 5,676,994 | A | 10/1997 | Eskins et al. |
| 6,608,017 | B1 | 8/2003 | Dihora et al. |
| 8,163,515 | B2 | 4/2012 | Burja et al. |
| 10,385,370 | B2 | 8/2019 | Sun et al. |
| 11,198,981 | B2 | 12/2021 | Cofano et al. |
| 2010/0310728 | A1 | 12/2010 | van Lengerich et al. |

FOREIGN PATENT DOCUMENTS

| | | | | |
|---|---|---|---|---|
| CN | 110100990 | A | 8/2019 | |
| DE | 69531674 | T2 | 10/2003 | |
| EP | 0385081 | A2 | 9/1990 | |
| EP | 0424578 | A1 | 5/1991 | |
| EP | 0862369 | B2 * | 9/2009 | ............... A21D 2/16 |
| GB | 2240702 | B | 3/1994 | |
| JP | S6049097 | A | 3/1985 | |
| JP | H02305898 | A | 12/1990 | |
| WO | 9401001 | A1 | 1/1994 | |
| WO | 2018206856 | A1 | 11/2018 | |

OTHER PUBLICATIONS

Food and Agriculture Organization of the United Nations. Standard for Fish Oil. Obtained on Jan. 21, 2026 from Wayback Machine. Dec. 2, 2019. Full citation of URL in the Office Action. (Year: 2019).*

Konuskan et al. Saudi Journal of Biological Sciences 26.2 (2019): 340-344. (Year: 2019).*

TH2401008217, "Office Action", May 21, 2025, 7 pages.

SA1120247135, "Office Action", Sep. 24, 2025, 10 pages.

PCT/IB2023/056049, "International Search Report and Written Opinion", Sep. 12, 2023, 12 pages.

Alam et al., "Extrusion and Extruded Products: Changes in Quality Attributes as Affected by Extrusion Process Parameters: A Review", Critical Reviews in Food Science and Nutrition, 56:3, 2016, 445-473.

Aro et al., "The Utilization of Oat Polar Lipids Produced by Supercritical Fluid Technologies in the Encapsulation of Probiotics", LTW—Food Science and Technology, 53, 2013, 540-546.

Choton et al., "Extrusion Technology and Its Application in Food Process: A Review", The Pharma Innovation 9(2), 2020, 162-168.

Kurek et al., "Barley β-D-glucan—modified starch complex as potential encapsulation agent for fish oil", International Journal of Biological Macromolecules, 120, 2018., 2018, 596-602.

Liu et al., "Reduction of omega-3 oil oxidation in stable emulsion of caseinate-omega-3 oil-oat beta-glucan", LTW—Food Science and Technology 62, 2015, 1083-1090.

Ralla et al., "Oat bran extract (*Avena sativa* L.) from food by-product streams as new natural emulsifier", Food Hydrocolloids 81, 2018, 253-262.

EP23823367.0, "Extended European Search Report", May 12, 2026, 9 pages.

SA1120247135, "Office Action", Apr. 22, 2026, 7 pages.

* cited by examiner

*Primary Examiner* — Erik Kashnikow
*Assistant Examiner* — Janice Y Silverman
(74) *Attorney, Agent, or Firm* — Kilpatrick Townsend & Stockton LLP

(57) ABSTRACT

Provided herein is an encapsulated oil particle wherein the oil is encapsulated by a composition comprising oat flour. Also, provided herein is a method of making encapsulated oil particles comprising combining oat flour and oil to form a first composition, mixing the first composition, homogenizing the mixed first composition to produce a second composition, and spray drying the second composition to produce encapsulated oil particles. Further provided are foods, food products (e.g., baby formula), or dietary supplements containing the encapsulated oil particles.

22 Claims, 2 Drawing Sheets

OIL ENCAPSULATED IN NATURAL PLANT-BASED MATERIAL

CROSS REFERENCE TO RELATED APPLICATION

This application claims priority to U.S. Provisional Patent Application No. 63/352,190, filed Jun. 14, 2022, which is incorporated by reference herein in its entirety.

BACKGROUND

Oils high in essential fatty acids such as docosahexaenoic acid ("DHA") and eicosapentaenoic acid ("EPA") are prone to oxidation, producing aldehydes and other oxidation products that result in an unpleasant taste or smell. This oxidation thus affects the use of lipids and oils in foods, beverages, and dietary supplements. To increase the shelf-life of the oils or products containing the oils, it is necessary to avoid oxidation.

BRIEF SUMMARY

Provided herein is an encapsulated oil particle, comprising an oil encapsulated by a plant-based composition comprising oat flour, such as hydrolyzed oat flour. The composition comprising oat flour can also include fatty acids selected from the group consisting of alpha linolenic acid, arachidonic acid, docosahexaenoic acid, docosapentaenoic acid, eicosapentaenoic acid, gamma-linolenic acid, linoleic acid, and any combination thereof. The oat flour can include fatty acids, cholesterol, carbohydrates, ash, protein, calcium, sodium, potassium, and iron.

Optionally, the encapsulated oil comprises up to 50% oil. The encapsulated oil particle may contain microbial oil, plant-based oil, fish oil, or any combination thereof. Optionally, the oil comprises omega-3 fatty acids and/or triglycerides. The fatty acids can be selected from the group consisting of palmitic acid (C16:0), myristic acid (C14:0), palmitoleic acid (C16:1(n-7)), cis-vaccenic acid (C18:1(n-7)), docosapentaenoic acid (C22:5(n-6)), docosahexaenoic acid (C22:6(n-3)), and combinations thereof. Optionally, the oil comprises fatty acids in ethyl ester form. The encapsulated oil containing fatty acids can include less than 35% saturated fatty acids. Optionally, 10-30% of the fatty acids are omega-7 fatty acids and greater than 37% of the fatty acids are docosahexaenoic acid (DHA). The saturated fatty acids comprising the encapsulated oil can be myristic acid, palmitic acid, or a combination thereof. Optionally, 8-12% of the fatty acids are myristic acid. Optionally, 14-22% of the fatty acids are palmitic acid. The saturated fatty acids can include less than 2% lauric acid, or pentadecanoic acid, margaric acid, staeric acid, or any combination thereof. Optionally, in the encapsulated oil, greater than 95% of the triglycerides are comprised of myristic acid (C14:0), palmitic acid (C16:0), docosapentaenoic acid n-6 (C22:5n-6, DPAn6), and docosahexaenoic acid (C22:6n-3, DHA). The encapsulated oil optionally includes less than 3% of each of lauric acid (C12:0), pentadecylic acid (C15:0), palmitoleic acid (C16:1), margaric acid (C17:0), stearic acid (C18:0), vaccenic acid (C18:1n-7), oleic acid (C18:1n-9), γ-linolenic acid (C18:3n-6), α-linolenic acid (C18:3n-3), stearidonic acid (C18:4), arachidic acid (C20:0), dihomo-γ-linolenic acid (C20:3n-6), arachidonic acid (C20:4n-6, ARA), eicosapentaenoic acid (C20:5n-3, EPA), behenic acid (C22:0), docosatetraenoic acid (C22:4), docosapentaenoic acid n3 (C22:5n-3, DPAn3), and lignoceric acid (C24:0). Optionally, the oil comprises less than 0.02% short chain fatty acids. Optionally, the oil comprises at least 35% C22:6n-3 (DHA) of the total fatty acids.

The encapsulated oil particles can also include an emulsifier. The emulsifier can be, for example, a quillaja extract, lecithin, monoglycerides, diglycerides, polysorbate, gums, and proteins. Both animal proteins such as from milk and egg as well as plant-based proteins such as from soy, wheat, pea, potato, oat, and barley or combinations thereof can be used for their emulsifying capabilities. Optionally, the emulsifier is an oat-based protein. Optionally, the emulsifier is located inside the encapsulating layer.

Provided herein is a composition comprising multiple encapsulated oil particles. Optionally, at least 50% of the encapsulated oil particles in the composition are less than 1 micron in diameter.

Also provided herein is a method of making encapsulated oil particles. The method comprises combining oat flour and oil, and optionally, other ingredients to form a first composition, mixing the first composition, homogenizing the mixed first composition to produce a second composition, and spray drying the second composition to produce encapsulated oil particles. The mixing step optionally comprises mechanical mixing such as high shear mixing. High shear mixing is optionally performed at 5,000 to 15,000 rpm for 1-5 minutes (e.g., for 3 minutes at 14,000 rpm). The homogenization optionally is performed with a microfluidizer at 2K to 5K psi. Optionally, the homogenization step is repeated at least twice prior to spray dying. The spray drying can occur in the presence of a gas (e.g., nitrogen) or in normal air.

DETAILED DESCRIPTION

Figure 1:
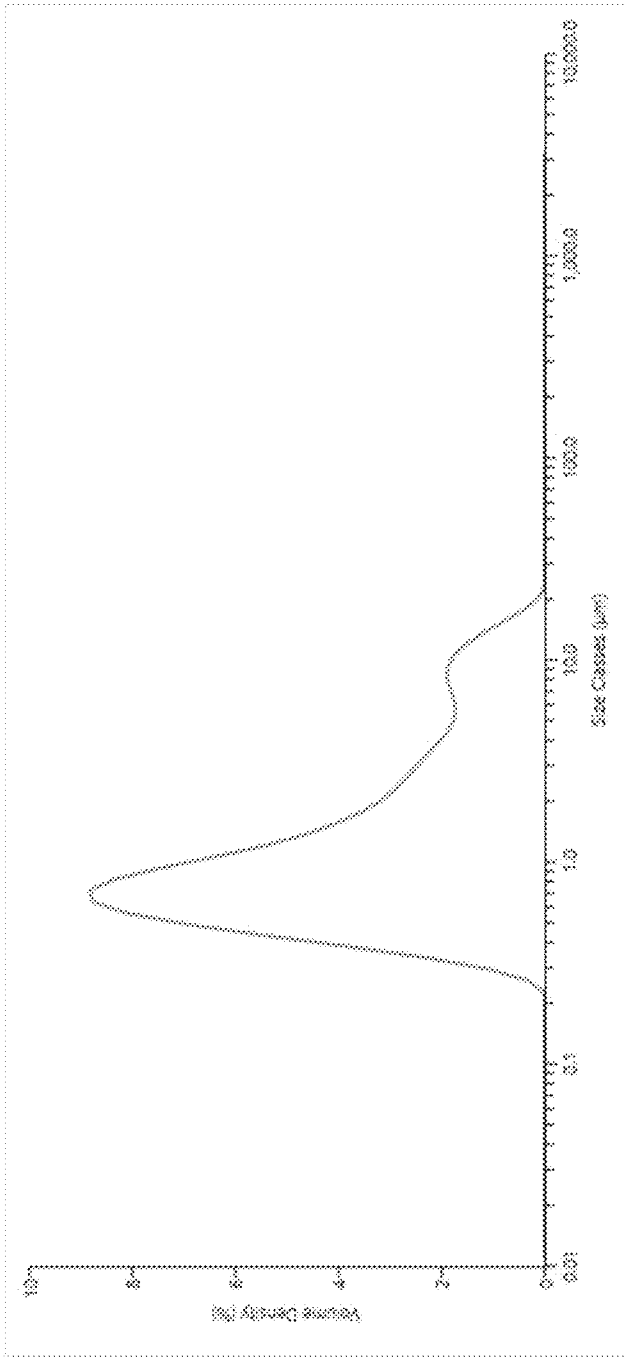
FIG. 1 shows a graph depicting the oil droplet volumetric distribution.

Oils that contain unsaturated fatty acids, especially long chain fatty acids, are susceptible to oxidation, which can result in unacceptable changes in the flavor and smell of the oil. Microencapsulation of oil droplets to form encapsulated oil particles can be used to reduce oxidation of the fatty acids in oils, such as fish oils or microbial oils. Microencapsulation is a process in which tiny particles or droplets of the active ingredient (e.g., oil) are surrounded by a coating or embedded in a homogeneous or heterogeneous matrix, traditionally of polymeric materials, to yield small particles that range in size from sub-micron to several millimeters in diameter. Studies in Natural Products Chemistry: Volume 37. (eBook, 2012). Traditionally, microencapsulated oil particles are made with highly refined ingredients, such as maltodextrin or modified starch or material derived from genetically modified microorganisms (such as corn based starch). Such materials, however, typically contain high sugar content, animal products (such as gelatin), or allergens (such as dairy products). The disclosed encapsulated oil particles, in contrast, comprise a plant-based matrix (e.g., oat flour), which reduces or eliminates sugar content, animal products, and allergens in the resulting encapsulated oil particles.

Encapsulated Oil Particles

The encapsulated oil particles disclosed herein include an oil and a plant based encapsulation material. Optionally, the composition comprising oat flour can also include oil soluble nutrients selected from a group consisting of vitamin A, vitamin D, vitamin E, vitamin K, lycopene, coenzyme Q-10, and astaxanthin. Optionally the particles further include an emulsifier. Optionally, the encapsulated oil is rich in fatty acids. Fatty acids are hydrocarbon chains that terminate in a carboxyl group. Unsaturated fatty acids contain at least one carbon-carbon double bond, whereas unsaturated fatty acids contain multiple carbon-carbon double bonds. Fatty acids include short-chain fatty acids (SCFA), which are fatty acids with aliphatic tails of fewer than six carbons (e.g., butyric acid); medium-chain fatty acids (MCFA), which are fatty acids with aliphatic tails 6-12 carbons; long-chain fatty acids (LCFA), which are fatty acids with aliphatic tails 13-21 carbons; and very long chain fatty acids (VLCFA), which are fatty acids with aliphatic tails longer than 22 carbons. Long chain fatty acids (LCFA) include, but are not limited to, myristate (C14:0), palmitic acid (C16:0), docosapentaenoic acid n-6 (C22:5n-6, DPAn6), docosahexaenoic acid (C22:6n-3, DHA), lauric acid (C12:0), pentadecylic acid (C15:0), palmitoleic acid (C16:1), margaric acid (C17:0), stearic acid (C18:0), vaccenic acid (C18:1n-7), oleic acid (C18:1n-9), γ-linolenic acid (C18:3n-6), α-linolenic acid (C18:3n-3), stearidonic acid (C18:4), arachidic acid (C20:0), dihomo-γ-linolenic acid (C20:3n-6), arachidonic acid (C20:4n-6, ARA), eicosapentaenoic acid (C20:5n-3, EPA), behenic acid (C22:0), docosatetraenoic acid (C22:4), docosapentaenoic acid n3 (C22:5n-3, DPAn3), and lignoceric acid (C24:0).

The oil may be a fish oil, microbial oil vegetable oil, or other oil that can be metabolized in the body of the human or non-human subject. Non-human subjects include for example, fish, livestock (e.g., cattle, chicken, sheep), domesticated animals (e.g., cats, dogs, gerbils, guinea pigs, etc.).

Fish oils for encapsulation can be selected from those rich in omega-3 fatty acid content. By way of example, fish that are especially rich in these oils include mackerel, herring, tuna, and salmon.

Vegetable oil can be derived from sources such as nuts, seeds, and grains. Exemplary vegetable oils for encapsulation include peanut oil, canola oil, soybean oil, coconut oil, olive oil, safflower oil, cottonseed oil, sunflower oil, sesame oil, grapeseed oil, palm oil, and corn oil.

Microbial oils as sued herein include oils derived from unicellular organisms native to aquatic or terrestrial environments or laboratory versions thereof. Such organisms can be eukaryotic or prokaryotic microalgae. The microalgae can be selected from the genus *Schizochytrium, Oblongichytrium, Aurantiochytrium*, and *Ulkenia* or any mixtures thereof. Optionally, the microorganism is a thraustochytrid of the order Thraustochytriales, more specifically Thraustochytriales of the genus *Thraustochytrium*. Exemplary microorganisms include Thraustochytriales as described in U.S. Pat. Nos. 5,340,594 and 5,340,742, which are incorporated herein by reference in their entireties. The microorganism can be a *Thraustochytrium* species, such as the *Thraustochytrium* species deposited as ATCC Accession No. PTA-6245 (i.e., T18), as described in U.S. Pat. No. 8,163,515, which is incorporated by reference herein in its entirety. Thus, optionally, the microorganisms are of the family Thraustochytriaceae. Optionally, the microorganisms are of the genus *Thraustochytrium*. Optionally, the microorganisms are T18, deposited with ATCC as PTA-6245. The oil can also be produced as described in U.S. Pat. Nos. 10,385,370 and 11,198,891, which are incorporated herein by reference in their entireties.

Optionally, the oil is derived from a G3 strain of thraustochytrid, specifically an *Aurantiochytrium* sp., deposited with the International Depositary Authority of Canada (IDAC) and assigned Accession No. 220716-01. The G3 strain can accumulate significant amounts of biomass in a shorter period of time than other thraustochytrids. Furthermore, the G3-1 strain can accumulate high concentrations of oil rich in docosahexaenoic acid (DHA) and palmitic acid (C16:0). Also, the G3 strain can further accumulate protein to a level that composes around 30% of its biomass dry weight. In summary, the G3 strain produces a biomass rich in DHA, palmitic acid and protein in a short period of time. The G3 strain can be grown and cultivated as described in U.S. Pat. No. 11,198,891, which is incorporated herein by reference in its entirety.

The term thraustochytrid, as used herein, refers to any member of the order Thraustochytriales, which includes the family Thraustochytriaceae. Strains described as thraustochytrids include the following organisms: Order: Thraustochytriales; Family: Thraustochytriaceae; Genera: *Thraustochytrium* (Species: sp., *arudimentale, aureum, benthicola, globosum, kinnei, motivum, multirudimentale, pachydermum, proliferum, roseum, striatum*), *Ulkenia* (Species: sp., *amoeboidea, kerguelensis, minuta, profunda, radiate, sailens, sakariana, schizochytrops, visurgensis, yorkensis*), *Schizochytrium* (Species: sp., *aggregatum, limnaceum, mangrovei, minutum, octosporuni*), Japoniochytrium (Species: sp., *marinum*), *Aplanochytrium* (Species: sp., *haliotidis, kerguelensis, profunda, stocchinoi*), *Althornia* (Species: sp., *crouchii*), or *Elina* (Species: sp., *marisalba, sinorifica*). Species described within *Ulkenia* are considered to be members of the genus *Thraustochytrium*. Strains described as being within the genus *Thraustochytrium* may share traits in common with and also be described as falling within the genus *Schizochytrium*. For example, in some taxonomic classifications T18 may be considered within the genus *Thraustochytrium*, while in other classifications it may be described as within the genus *Schizochytrium* because it comprises traits indicative of both genera.

The oil of the encapsulated oil can comprise fatty acids selected from the group consisting of alpha linolenic acid, arachidonic acid, docosahexaenoic acid (DHA)(C22:6(n-3), docosapentaenoic acid C22:5(n-6)), eicosapentaenoic acid, gamma-linolenic acid, linoleic acid, and any combination thereof. Optionally at 30-35% of the total fatty acids in the encapsulated oil is DHA. Optionally, the oil comprises triglycerides (i.e., molecules composed of three fatty acids covalently linked to a glyceride molecule). The encapsulated oil can further comprise fatty acids selected from the group consisting of palmitic acid (C16:0), myristic acid (C14:0), palmitoleic acid (C16:1(n-7)), vaccenic acid (C18:1 (n-9)), cis-vaccenic acid (C18:1(n-7)) and combinations thereof. Optionally, the oil comprises one or more fatty acids in ethyl ester form. The encapsulated oil can comprise saturated fatty acids, wherein the saturated fatty acids are myristic acid, palmitic acid, or a combination thereof. Optionally, 8-12% of the fatty acids are myristic acid. Optionally, 14-22% of the fatty acids are palmitic acid. Optionally, the saturated fatty acids comprise less than 2% lauric acid, or pentadecanoic acid, margaric acid, staeric acid, or any combination thereof.

The encapsulated oil can comprise less than 35% saturated fatty acids, wherein 10-30% of the fatty acids are omega-7 fatty acids and wherein greater than 37% of the fatty acids are docosahexaenoic acid (DHA). The omega-7 fatty acids include, for example, palmitoleic acid (C16:1(n-7)), cis-vaccenic acid (C18:1(n-7)), or a combination thereof. The oil encapsulated by the composition optionally comprises 30-35%, 25-35%, 25-30%, 20-30%, 20-25%, 15-25%, 15-20%, 10-20%, 10-15%, 5-15%, 5-10%, or less than 5% saturated fatty acids. In one approach, the oil encapsulated by the composition comprising oat flour can further comprise 37-40%, 37-45%, 40-50%, 45-55%, 50-60%, 55-65%, 60-70%, 65-75%, 70-80%, 75-85%, 80-90%, 85-95%, or more DHA. Optionally, in the encapsulated oil, greater than 95-99% of the triglycerides are comprised of myristic acid (C14:0), palmitic acid (C16:0), docosapentaenoic acid n-6 (C22:5n-6, DPAn6), and docosahexaenoic acid (C22:6n-3, DHA).

The encapsulated oil can comprise less than 3% of each of lauric acid (C12:0), pentadecylic acid (C15:0), palmitoleic acid (C16:1), margaric acid (C17:0), stearic acid (C18:0), vaccenic acid (C18:1n-7), oleic acid (C18:1n-9), γ-linolenic acid (C18:3n-6), α-linolenic acid (C18:3n-3), stearidonic acid (C18:4), arachidic acid (C20:0), dihomo-γ-linolenic acid (C20:3n-6), arachidonic acid (C20:4n-6, ARA), eicosapentaenoic acid (C20:5n-3, EPA), behenic acid (C22:0), docosatetraenoic acid (C22:4), docosapentaenoic acid n3 (C22:5n-3, DPAn3), and lignoceric acid (C24:0). Optionally, the oil comprises less than 2% of each of lauric acid (C12:0), pentadecylic acid (C15:0), palmitoleic acid (C16:1), margaric acid (C17:0), stearic acid (C18:0), vaccenic acid (C18:1n-7), oleic acid (C18:1n-9), γ-linolenic acid (C18:3n-6), α-linolenic acid (C18:3n-3), stearidonic acid (C18:4), arachidic acid (C20:0), dihomo-γ-linolenic acid (C20:3n-6), arachidonic acid (C20:4n-6, ARA), eicosapentaenoic acid (C20:5n-3, EPA), behenic acid (C22:0), docosatetraenoic acid (C22:4), docosapentaenoic acid n3 (C22:5n-3, DPAn3), and lignoceric acid (C24:0). Optionally, the oil comprises less than 1% of each of lauric acid (C12:0), pentadecylic acid (C15:0), palmitoleic acid (C16:1), margaric acid (C17:0), stearic acid (C18:0), vaccenic acid (C18:1n-7), oleic acid (C18:1n-9), γ-linolenic acid (C18:3n-6), α-linolenic acid (C18:3n-3), stearidonic acid (C18:4), arachidic acid (C20:0), dihomo-γ-linolenic acid (C20:3n-6), arachidonic acid (C20:4n-6, ARA), eicosapentaenoic acid (C20:5n-3, EPA), behenic acid (C22:0), docosatetraenoic acid (C22:4), docosapentaenoic acid n3 (C22:5n-3, DPAn3), and lignoceric acid (C24:0).

The encapsulation matrix is a plant-based material. By way of example, the plant based material is optionally oat flour, which contains few allergens. Oat flour is also less expensive than encapsulants, such as gums. Oat flour requires minimal processing. The oats are kiln treated and de-hulled to produce the flour. Optionally, the oat flour is hydrolyzed.

Oat flour naturally includes vitamin E, phenolic compounds (e.g., ester linked glycerol conjugates, ester linked alkyl conjugates, ether and ester linked glycerides, anthranilic acids and avenanthramides), and polar lipids, which provide emulsifying capabilities and protect the oil from oxidation. The phenolic compounds have antioxidant activity, as do other antioxidants present in oat flour, including tocopherols, L-ascorbic acid, thiols, and phenolic amino acids. However, most of the antioxidants in oat flour are bound to proteins or carbohydrates. Enzymes present in oats, such as amylase, can convert the carbohydrate to sugar and release the bound phenolic compounds from oats to the media. Further, after hydrolysis of the oats, both water solubility and emulsifying capability are significantly improved.

The oat flour used for encapsulation of the oil is optionally hydrolyzed. The hydrolyzed oat flour can include fatty acids, cholesterol, carbohydrates, ash, protein, calcium, sodium, potassium, and iron. Optionally, the hydrolyzed oat flour comprises 5-10% fatty acids. Optionally, the hydrolyzed oat flour comprises 70-75% carbohydrates. The hydrolyzed oat flour can include 10-15% protein.

In addition to the oil and the plant-based encapsulating material, the encapsulated oil particles optionally further include an emulsifier. Such an emulsifier can be a non-heterologous emulsifier (i.e., not an emulsifier naturally present in the plant-based encapsulating material) added to a mixture of oil and plant-based encapsulating material (e.g., oat flour) to facilitate suspension or miscibility of the oil into the plant-based encapsulating material. The emulsifier can be selected from a group consisting of quillaja extract, lecithin, monoglycerides, diglycerides, polysorbate, gums, and proteins. The emulsifier can further be selected from a group consisting of mono and diglycerides, fatty acid derivatives such as polyglycerol esters (PGE), propylene glycol esters (PGMS), stearoyl lactylates, sucrose esters, sorbitan esters, polysorbates, lecithin extracted from egg yolk or vegetable oils such as soybeans, sunflower, and canola oil.

In general, "emulsion" as used herein refers to a substance that contains both a dispersed and continuous phase. Often, emulsions are either oil suspended in an aqueous phase (o/w) or water suspended in oil (w/o). Emulsifiers are amphiphilic and contain water soluble head and oil soluble tail, so that emulsifiers are able to attach to both polar and nonpolar compounds to achieve a stable emulsion. When added into an o/w emulsion, the emulsifier orients the nonpolar tails extend into the oil while the polar head faces the water. Due to their amphiphilic nature, proteins make good emulsifiers. Proteins are capable of stabilizing emulsion by adsorbing at the interface, coating oil or air droplets, and developing stable films. Both animal protein such as from milk, egg and plant-based proteins such as from soy, wheat, pea, and potato, oat, and barely can be used for their emulsifying capabilities.

Compositions of Encapsulated Oil Particles

Further disclosed herein are compositions containing oil particles. Compositions comprising multiple encapsulated oil particles can be in a powder form. Optionally, 50% of the encapsulated oil particles in the powdered composition are less than 1 micron in diameter and the oil comprises up to 50% of the powdered composition. For example, the oil can be from 0.001% to 50%, 1% to 50%, 5% to 50%, 10% to 50%, 20% to 50%, 25% to 50%, 30% to 50% or 40% to 50% of the powdered composition. The encapsulated oil droplets in the composition can be between 0.4-100 μm in diameter.

A powder composition comprising encapsulated oil particles can be mixed with other dry components or with liquid components. The powder comprising oil encapsulated in oat flour is white to yellow-brown in color with a characteristic "oaty" or neutral taste and aroma.

The powder could be used in a wide range of dry products (e.g., protein mixes, dry infant formula, dry milk, dry cereals or grains, etc.). The powder can be mixed with fluids or other diluents to produce confectionaries (e.g., chocolate, gummies, candies, jellies, and biscuits), beverages (e.g., milk, sports drinks, energy drinks, teas, smoothies, and juices), dairy products (e.g., yogurt), cereals and grains (e.g., porridge, oatmeal, and infant cereals), dietary supplements (e.g., vitamins or mineral products, herbal products, amino acid products, and enzyme supplements).

The powder can be used in animal feed. Examples of animal feeds include pet foods (e.g., cat, dog, gerbil, and hamster food), fish food (e.g., for aquarium fish, cultured fish or crustaceans, farm-raised fish or crustaceans), and livestock (cattle, sheep, goats, chickens, ducks, etc.). Such feeds into which the encapsulants are incorporated are designed to be palatable to the organism and to provide the necessary nutrients.

The powder can be incorporated into a nutraceutical or pharmaceutical product. Examples of a nutraceutical or pharmaceutical include various types of tablets, capsules, drinkable agents, and the like.

Food products can be made by known methods in the art. By way of example, extrusion technology can be used for production of cereals including breakfast cereals. Through the extrusion process a mixture of grains, starches, sugars, and other ingredients is transformed into the shapes and textures of cereals. This technology involves forcing the cereal dough through a specialized machine called an extruder, which utilizes heat, pressure, and mechanical shear to cook the mixture and shape it into various forms like flakes, loops, or puffs. The extruder's parameters, including temperature, moisture content, and screw speed, are tailored to achieve the desired product attributes, such as crunchiness, flavor, and appearance. Extrusion technology enables efficient large-scale production of cereals including breakfast cereals, ensuring consistent quality and allowing for an extensive range of flavor options to satisfy the diverse tastes and preferences of consumers worldwide. Extrusion methods are known to those in the art and are described in, for example, Choton, et al., "Extrusion technology and its application in food processing: A review." The Pharma Innovation 9(2):162-68 (2020) and Alam et al., "Extrusion and Extruded Products: Changes in Quality Attributes as Affected by Extrusion Process Parameters: A Review," Critical Reviews in Food Science and Nutrition 56:3 445-73 (2016), which are incorporated by reference herein in their entireties.

Methods of Making Encapsulated Oil Particles

Provided herein is a method of making encapsulated oil particles comprising combining a plant-based encapsulation material (e.g., oat flour) and oil to form a first composition, mixing the first composition, homogenizing the mixed first composition to produce a second composition, and spray drying the second composition to produce encapsulated oil particles. The oat flour is optionally hydrolyzed oat four. Hydrolyzed oat four can be made, for example, by hydrating oats with water under agitation. The method optionally further comprises adding an emulsifier to the oil and oat flour prior to or during mixing. Mixing the first composition can be performed using mechanical force, such as high shear mixing at 5,000 to 15,000 rpm for 1-5 minutes. Alternatively, the first composition can be performed using mechanical force at 5,000 to 20,000 rpm for 1-5 minutes. By way of example, high shear mixing can be performed for 3 minutes at 14,000 rpm; for less than 1 minute at over 15,000 rpm; for 1 minute at or below 15,000 or 20,000 rpm; for 2 minutes at or below 15,000 or 20,000 rpm; for 3 minutes at or below 15,000 or 20,000 rpm; for 4 minutes at or below 15,000 or 20,000 rpm; for 5 minutes at or below 15,000 or 20,000 rpm.

Homogenization is optionally performed using a microfluidizer, for example, at 1,000 to 30,000 psi. Optionally, homogenization is performed at 2,000 to 5,000 psi. By way of example, homogenization can be performed at 2,000 to 3,000 psi, at 2,000 to 4,000 psi; at 3,000 to 4,000 psi, 3,000 to 5,000 psi, or 4,000 to 5,000 psi. Optionally, the homogenization step is repeated at least twice prior to spray dying and can be performed 3, 4, or 5 times, for example.

The homogenized suspension is then spray dried. Convention spray drying is performed at high heat and oxygen levels to drive out moisture. However, the spray drying step used herein is performed at lower temperatures to avoid oxidation caused by high heat and oxygen levels. Spray drying in the present method is performed, for example, at a gas flow rate of 30 $Nm^3$/hr The spray drying can occur in the absence of oxygen or in a low oxygen atmosphere. Optionally, spray drying is performed under nitrogen. The resulting spray dried particles are optionally less than 5% water, less than 4% water, less than 3% water, less than 2% water, or less than 1% water.

Disclosed are materials, compositions, and components that can be used for, can be used in conjunction with, can be used in preparation for, or are products of the disclosed methods and compositions. These and other materials are disclosed herein, and it is understood that when combinations, subsets, interactions, groups, etc. of these materials are disclosed that while specific reference of each various individual and collective combinations and permutations of these compounds may not be explicitly disclosed, each is specifically contemplated and described herein. For example, if a method is disclosed and discussed and a number of modifications that can be made to a number of molecules including the method are discussed, each and every combination and permutation of the method, and the modifications that are possible are specifically contemplated unless specifically indicated to the contrary. Likewise, any subset or combination of these is also specifically contemplated and disclosed. This concept applies to all aspects of this disclosure including, but not limited to, steps in methods using the disclosed compositions. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

Publications cited herein and the material for which they are cited are hereby specifically incorporated by reference in their entireties.

EXAMPLES

The examples below are intended to further illustrate certain aspects of the methods and compositions described herein, and are not intended to limit the scope of the claims.

Example 1: Materials and Methods

Hydrolyzed oat flour was used as the encapsulant, quillaja extract was used as the emulsifier and algal oil with 530 mg/g of DHA was used as the active ingredient. Typical nutritional values of the oat flour per 100 grams is as follows: Energy (kJ) 1770±354; Energy (kcal) 419±83.8; Fat (g) 6.5±1.3, of which saturates (g) 1.0 Polyunsaturated Fat (g) 2.3 Monounsaturated Fat (g) 1.9 Trans Fatty Acid (g)<0.01 Cholesterol (mg)<0.5; Total Carbohydrates (g) 76.7±15.3, of which sugars (g) 4-6.0 Dietary Fibre (g) 5.1-7.7 Beta-glucan (g) 3.3-5.0; Ash (g) 1.3-2.0; Protein, as is (N×6.25) 11.0; Calcium (mg) 70.5; Sodium (mg) 8.2; Potassium (mg) 330; and Iron (mg) 3.3.

The oat flour was hydrated in water under agitation for approximately two hours. Following hydration of the oat flour, the oat flour was sieved through a 170 mesh screen.

The remainder of ingredients were added slowly under agitation. After the remainder of the ingredients were added, the mixture was high shear mixed for three minutes at 14,000 rpm. The suspension was then homogenized with microfluidizer at 3,000 psi for one pass. The emulsion was then spray dried at a gas flow rate of 30 $nm^3$/hr, with an inlet temperature of 110° C. and an outlet temperature of 54° C.

Figure 2:
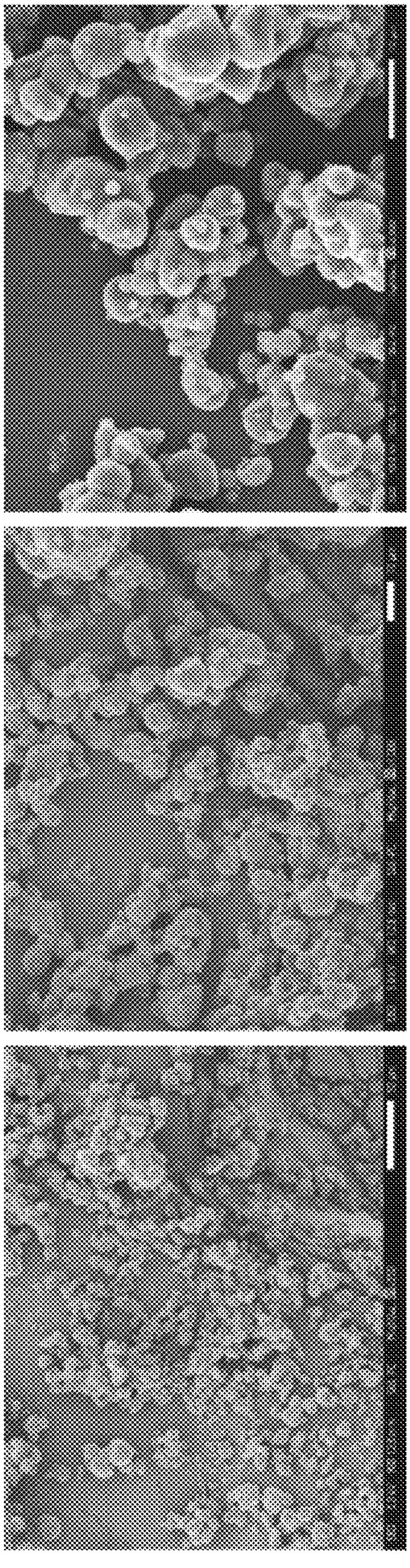
FIG. 2 shows scanning electron micrographs of the oil encapsulated in a hydrolyzed oat flour composition at magnifications of 350×, 1000×, and 2000× (from left to right).

Oil droplet sizes as well as the particle size volumetric distribution were analyzed. A scanning electron microscope was used to evaluate the morphology of the powder. Table 1 below shows the Dv at 10%, 50%, and 90%, which signifies the point in the size distribution, up to and including which, 10, 50, or 90% of the total volume of material in the sample is encapsulated. Thus, the Dv90 is 303 μm, meaning that 90% of the sample has a size of about 303 μm or smaller. FIG. 1 shows that the oil droplet size (Dv50) was less than 1 μm. The emulsion was then dried at 15% solids and the powder had a final moisture of 2.13% and water activity of 0.12. Overall, the particles had a relative round shape as shown in the scanning electron micrographs, FIG. 2.

TABLE 1

Encapsulated powder particle size

| | μm |
|---|---|
| Dv (10) | 8.42 |
| Dv (50) | 32.3 |
| Dv (90) | 303 |

Example 2: Feasibility Experiment

Algal oil was collected from the freezer and allowed to thaw in a water bath. Commercially available oat flour (Hydrolyzed Oat Flour, Glanbia, Kilkenny, Ireland) was weighed into one or more beakers and allowed to hydrate for a minimum of 30 minutes but up to overnight to aid in filtration step. Following hydration, Oat16 was filtered through 170 mesh sieve. In the filtration step, 1.5-2% of the solids are removed. To the filtered solid, 50.9 g of algal oil and 0.8 g of a commercially available antioxidant composition (RPT40, Kemin, Iowa) were added and the beakers were covered to reduce oxidation. High shear mixing at 14K rpm for 3 minutes followed. Next, with the microfluidizer at 4000 psi, the mixture was homogenized for 2-3 passes. After each pass, a small sample was collected for oil droplet size analysis. Once the desired droplet size was achieved, the spray drying step followed. The selected droplet size was less than 1 micron. If the oil droplet size was not achieved, the homogenization step was repeated with the microfluidizer at 20,000 psi, being careful to avoid over-processing and breaking the emulsion. Table 2 shows the components in three batches. In each batch Q-Naturale® (a commercially available natural emulsifier extracted from Quillaj a tree) (Ingredion, Westchester, IL).

TABLE 2

Scalable batch data.

| | Batch 1 Water (target 15%) | | Batch 2 | | Batch 3 | |
|---|---|---|---|---|---|---|
| | Dry Basis (%) | Wet Basis (g) | Dry Basis (%) | Wet Basis (g) | Dry Basis (%) | Wet Basis (g) |
| Algal Oil | 40 | 40 | 40 | 40 | 45 | 45 |
| Oat16 | 59.46 | 59.46 | 59 | 59 | 54 | 54 |
| q-naturale | 0.54 | 2.7 | 1 | 5 | 1 | 5 |
| RPT40 | | 0.8 | | 0.8 | | 0.8 |
| Sub-Total | 100 | 564.5 | 100 | 562.7 | 100 | 562.7 |

Example 3. Cereal With Encapsulated Oil

One challenge in incorporating DHA into extruded products lies in maintaining its stability during the extrusion process. DHA is sensitive to heat, oxygen, and light, which can cause degradation and loss of its nutritional benefits. The high temperatures and shear forces involved in extrusion can potentially affect the integrity of DHA.

As described in this example, encapsulated algal oil was incorporated into breakfast cereal using an extrusion process.

The encapsulated oil with oat flour was made using the methods described herein. Briefly, the oat flour, oil and other ingredients were mixed at 5,000 to 15,000 rpm for 1-5 minutes (e.g., for 3 minutes at 14,000 rpm) and then homogenized at 3000-5000 PSI. The resultant emulsion was spray dried into powder, with the inlet temperature between 80-180° C. and outlet temperature between 50-90° C.

To create the breakfast cereal, the encapsulated oil powder was mixed with other dry ingredients (such as oat flour, pea starch, and the like) and then extruded with Clextral EV32 twin-screw extruder with feed rate of 30-31 kg per hour at a temperature in the range of 40 to 115° C. Samples were collected and packed in nitrogen-flushed bag. The shelf life study of the extruded cereal were carried out at ambient conditions.

TABLE 2

Stability Data of Breakfast Cereal

| | TBARS (ppm)* | DHA (mg/serving) |
|---|---|---|
| Day 0 | 1.34 | 66.52 |
| 6 Months | 2.35 | 62.4 |

*TBARS is a measurement of secondary oxidation products.

The DHA concentration in the breakfast cereal was 66.52 mg per 30 g of serving size of the cereal. There was no degradation of the oil after storage at ambient temperature for 6 months. This example demonstrates the encapsulated oil particles described herein can be incorporated into food products including breakfast cereals.

A trained sensory panel comprised of three panelists was used to evaluate the intensity of marine or fishy flavor in the cereal. No fishy marine notes were detected by from the panelists for the samples with the encapsulated oil powder, even after storage at ambient condition for six months.

What is claimed is:

1. An encapsulated microbial oil particle, comprising a microbial oil encapsulated by a composition comprising oat flour, wherein the encapsulated oil particles comprise 40 to 50% oil.

2. The encapsulated oil particle of claim 1, wherein the oat flour is hydrolyzed oat flour.

3. The encapsulated oil particle of claim 1, wherein the oil further comprises oil soluble nutrients selected from a group consisting of vitamin A, vitamin D, vitamin E, vitamin K, lycopene, coenzyme Q-10, and astaxanthin.

4. The encapsulated oil particle of claim 1, wherein the oil comprises omega-3 fatty acids.

5. The encapsulated oil particle of claim 1, wherein the oil comprises fatty acids selected from the group consisting of alpha linolenic acid, arachidonic acid, docosahexaenoic acid, docosapentaenoic acid, eicosapentaenoic acid, gamma-linolenic acid, linoleic acid, and any combination thereof.

6. The encapsulated oil particle of claim 1, wherein the oil comprises triglycerides.

7. The encapsulated oil particle of claim 1, wherein the oil comprises fatty acids selected from the group consisting of palmitic acid (C16:0), myristic acid (C14:0), palmitoleic acid (C16:1(n-7)), cis-vaccenic acid (C18:1(n-7)), docosapentaenoic acid (C22:5(n-6)), docosahexaenoic acid (C22:6(n-3)), and combinations thereof.

8. The encapsulated oil particle of claim 1, wherein the oil comprises fatty acids in ethyl ester form.

9. The encapsulated oil particle of claim 1, wherein the oil comprises fatty acids, wherein the oil comprises less than 35% saturated fatty acids, wherein 10-30% of the fatty acids are omega-7 fatty acids, and wherein greater than 37% of the fatty acids are docosahexaenoic acid (DHA).

10. The encapsulated oil particle of claim 1, wherein the oil comprises saturated fatty acids, wherein the saturated fatty acids are myristic acid, palmitic acid, or a combination thereof.

11. The encapsulated oil particle of claim 1, wherein the oil comprises fatty acids and wherein 8-12% of the fatty acids are myristic acid.

12. The encapsulated oil particle of claim 1, wherein the oil comprises fatty acids and wherein 14-22% of the fatty acids are palmitic acid.

13. The encapsulated oil particle of claim 10, wherein the saturated fatty acids comprise less than 2% lauric acid, pentadecanoic acid, margaric acid, stearic acid, or any combination thereof.

14. The encapsulated oil particle of claim 6, wherein greater than 95% of the triglycerides are comprised of myristic acid (C14:0), palmitic acid (C16:0), docosapentaenoic acid n-6 (C22:5n-6, DPAn6), and docosahexaenoic acid (C22:6n-3, DHA).

15. The encapsulated oil particle of claim 1, wherein the oil comprises less than 3% of each of lauric acid (C12:0), pentadecylic acid (C15:0), palmitoleic acid (C16:1), margaric acid (C17:0), stearic acid (C18:0), vaccenic acid (C18:1n-7), oleic acid (C18:1n-9), γ-linolenic acid (C18:3n-6), α-linolenic acid (C18:3n-3), stearidonic acid (C18:4), arachidic acid (C20:0), dihomo-γ-linolenic acid (C20:3n-6), arachidonic acid (C20:4n-6, ARA), eicosapentaenoic acid (C20:5n-3, EPA), behenic acid (C22:0), docosatetraenoic acid (C22:4), docosapentaenoic acid n3 (C22:5n-3, DPAn3), and lignoceric acid (C24:0).

16. The encapsulated oil particle of claim 1, wherein the oil comprises less than 0.02% short chain fatty acids.

17. The encapsulated oil particle of claim 1, wherein the oil comprises at least 35% C22:6n-3 (DHA) in the triglycerides in the total fatty acids.

18. The encapsulated oil particle of claim 1, further comprising an emulsifier.

19. The encapsulated oil particle of claim 18, wherein the emulsifier is selected from a group consisting of quillaja extract, lecithin, monoglycerides, diglycerides, polysorbate, gums, and proteins.

20. The encapsulated oil particle of claim 2, wherein the hydrolyzed oat flour composition comprises 5-10% fatty acids, 10-15% protein, and 70-75% carbohydrates, cholesterol, ash, calcium, sodium, potassium, and iron.

21. A composition comprising multiple encapsulated oil particles of claim 1, wherein at least 50% of the encapsulated oil particles are less than 1 micron in diameter.

22. A food, food product, or dietary supplement comprising the encapsulated oil particles of claim 1.

* * * * *